(12) United States Patent
Regimbal et al.

(10) Patent No.: US 6,193,232 B1
(45) Date of Patent: Feb. 27, 2001

(54) DRIVE MECHANISM FOR SHEET MATERIAL FEED ROLLER

(75) Inventors: Laurent A. Regimbal, Eagle, ID (US); Teodoro Ortiz Michel, Jalisco (MX); Scott K. Carter, Jr., Holzgerlingen (DE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/348,723

(22) Filed: Jul. 6, 1999

(51) Int. Cl.$^7$ .................................................. B65H 5/06
(52) U.S. Cl. .............................. 271/272; 74/462; 464/158
(58) Field of Search ........................... 271/272; 74/413, 74/421 R, 462; 464/158

(56) References Cited

U.S. PATENT DOCUMENTS

| | | | | |
|---|---|---|---|---|
| 2,114,807 | * | 4/1938 | McCavitt | 468/158 |
| 2,638,011 | * | 5/1953 | Smith | 74/462 |
| 2,687,025 | * | 8/1954 | Wildhaber | 464/158 |
| 3,292,390 | * | 12/1966 | Wildhaber | 464/158 |
| 5,927,709 | * | 7/1999 | Greive | 271/272 |
| 6,059,280 | * | 5/2000 | Yamauchi et al. | 271/272 |

* cited by examiner

Primary Examiner—H. Grant Skaggs

(57) ABSTRACT

A gear wheel assembly is provided in a sheet material feed mechanism. The gear wheel assembly includes an annular cylindrical gear wheel having an interior surface defining an interior diameter, with a plurality of gear teeth extending from the interior surface. A pinion is mounted for rotation within the gear wheel. The pinion includes an exterior surface defining an outer diameter, the outer diameter of the pinion being less than the inner diameter of the gear wheel. A plurality of gear teeth extend outwardly from the exterior surface of the pinion. The pinion gear teeth have arcuate contact edges adapted to drivingly engage with gear teeth of the gear wheel. The contact edges of the pinion gear teeth can be provided with tapering radii of curvature, preferably tapering outwardly from the respective centers of the gear teeth. In an embodiment, the contact edges of the pinion gear teeth taper from 45 mm at the center to 25 mm at each edge. The gear wheel assembly can be configured so that there is a one-to-one correspondence of pinions to gear wheels in the sheet feed mechanism. At least one friction wheel can be mounted on the gear wheel shaft. A method of maintaining parallelism between a gear wheel and a support roller assembly in a sheet material feed mechanism is also disclosed. First, a gear wheel shaft having is provided. A pinion is then mounted for rotation with the gear wheel shaft, the pinion having a longitudinal axis coincident with the longitudinal axis of the shaft. A gear wheel capable of non-parallel alignment with the gear wheel shaft surrounds the pinion. A support roller including at least one support roller is also provided. The pinion is then actuated to impart uninterrupted rotational movement to the gear wheel when the gear wheel is parallel to the support roller assembly and out of parallel alignment with the pinion.

19 Claims, 2 Drawing Sheets

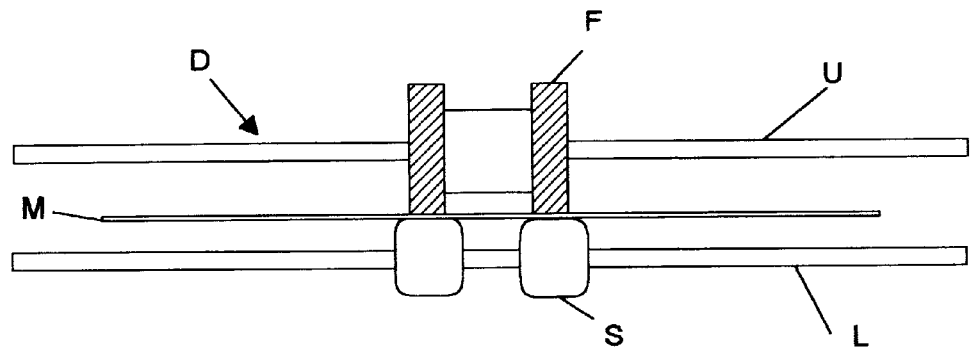
FIG. 1
(BACKGROUND ART)
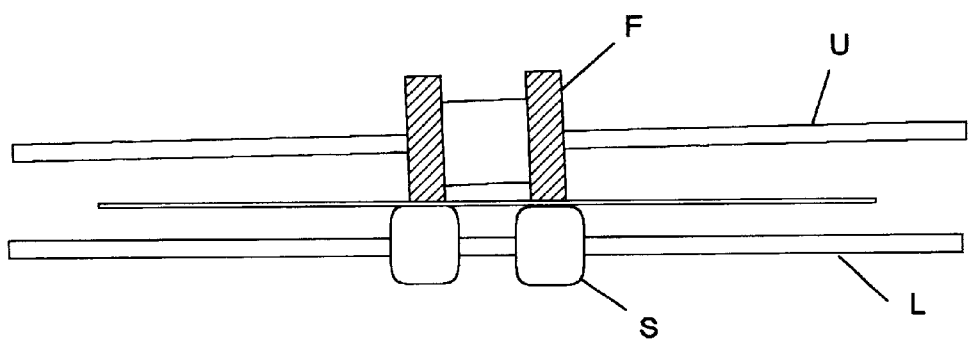
FIG. 2
(BACKGROUND ART)
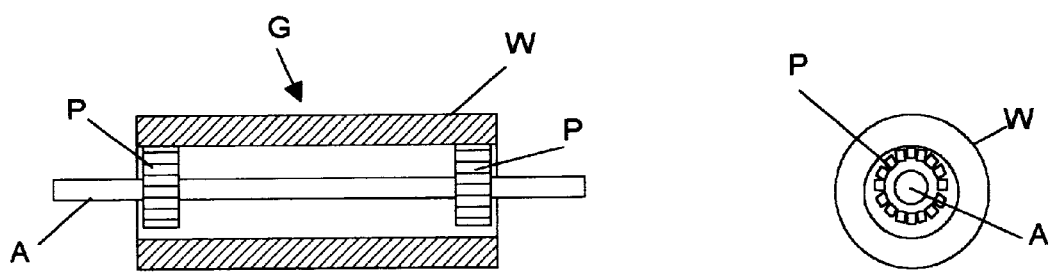
FIG. 3
(BACKGROUND ART)
FIG. 4
(BACKGROUND ART)

DRIVE MECHANISM FOR SHEET MATERIAL FEED ROLLER

FIELD OF THE INVENTION

The present invention relates to drive mechanisms for sheet material feed arrangements. Specifically, the invention relates to improved drive gear assemblies for sheet material feed rollers suitable for use in imaging systems.

BACKGROUND OF THE INVENTION

Imaging systems such as printers, fax machines, and copiers are virtually omnipresent, and can be found in homes and offices worldwide. The development of such systems has facilitated improvements in communication that have in turn fostered a sea of change in the way people live and work. Telecommuting, paperless offices, and intra-office networks represent but a few examples of the advancements that have been made possible by modern imaging systems.

Since these systems have become crucial to everyday existence, their reliability and smooth operation is paramount. It is therefore vitally important to design imaging systems so that downtime and work interruptions are minimized. This can be a daunting challenge, given the relative complexity of systems in which sheet material must be infed, moved through the imaging process, and outfed in a matter of seconds.

One common and recurring problem in imaging systems is document misfeed, which can result in sheet material such as paper getting lodged in the transport mechanism. This condition, often referred to as a "jam", is a source of frustration for system users.

One cause of such jams is misalignment between elements of the sheet feed drive mechanism. As shown in FIG. 1, a typical drive mechanism D includes a driven friction tire arrangement F mounted on an upper shaft U. Support rollers S are mounted on a lower shaft L in proximity with the friction tires F. Transport force is imparted to the sheet material M as it passes between the friction tires F and the support rollers S.

As long as the upper shaft U and lower shaft L remain relatively parallel as shown in FIG. 1, the friction tires F contact the support rollers S with approximately the same force, and thus produce approximately the same transport force with little or no skew.

Unfortunately, the shafts are seldom parallel in practice. When the upper shaft U and lower shaft L are out of parallel alignment, as shown in FIG. 2, the friction tires F do not contact the support rollers S squarely. Consequently, the friction tires F and support rollers S will produce uneven transport forces, and therefore skew the sheet being transported.

In an attempt to mitigate this problem, gear wheel assemblies can be constructed as shown in FIGS. 3 and 4. The gear wheel assembly G includes an annular cylindrical gear wheel W. The gear wheel W has an internal gear tooth profile T on each end. A pair of toothed pinions P are mounted on a shaft A. The teeth of the pinions P are square, and are intended to mesh with the tooth profiles T to drive the gear wheel W. The pinions P have an external diameter substantially smaller than the internal diameter of the gear wheel W.

The pinions P do not allow a high degree of tolerance for misalignment. When the upper shaft U and lower shaft L are significantly out of parallel alignment, the individual pinions tend to "jump" a tooth, causing one pinion to be one or more teeth "ahead of" or "behind" the other. This situation places the gear wheel W in an asymmetrical position, resulting in a skewed sheet.

It can thus be seen that the need exists for a drive mechanism that will increase the reliability of sheet feed arrangements by minimizing skewing.

SUMMARY OF THE INVENTION

These and other objects are achieved by providing a gear wheel assembly in a sheet material feed mechanism. The gear wheel assembly includes an annular cylindrical gear wheel having an interior surface defining an interior diameter, with a plurality of gear teeth extending from the interior surface. A pinion is mounted for rotation within the gear wheel. The pinion includes an exterior surface defining an outer diameter, the outer diameter of the pinion being less than the inner diameter of the gear wheel. A plurality of gear teeth extend outwardly from the exterior surface of the pinion. The pinion gear teeth have arcuate contact edges adapted to drivingly engage with gear teeth of the gear wheel.

The contact edges of the pinion gear teeth can be provided with tapering radii of curvature, preferably tapering outwardly from the respective centers of the gear teeth. In an embodiment, the contact edges of the pinion gear teeth have a radius of curvature of 45 mm for a gear wheel having a diameter of 10.5 mm.

The gear wheel assembly can be configured so that there is a one-to-one correspondence of pinions to gear wheels in the sheet feed mechanism. At least one friction wheel can be mounted on the gear wheel shaft.

A method of maintaining parallelism between a gear wheel and a support roller assembly in a sheet material feed mechanism is also disclosed. In a first step, a gear wheel shaft having a longitudinal axis is provided. A pinion is then mounted for rotation with the gear wheel shaft, the pinion having a longitudinal axis coincident with the longitudinal axis of the shaft. A gear wheel having a longitudinal axis capable of non-parallel alignment with the longitudinal axis of the gear wheel shaft surrounds the pinion. A support roller assembly having a longitudinal axis and including at least one support roller is also provided. The pinion is then actuated to impart uninterrupted rotational movement to the gear wheel when the longitudinal axis of the gear wheel is parallel to the longitudinal axis of the support roller assembly and out of parallel alignment with the longitudinal axis of the pinion.

DESCRIPTION OF THE DRAWINGS

FIGS. 1 through 4 schematically illustrate known sheet material transport drive mechanisms, as described.

DETAILED DESCRIPTION OF THE INVENTION

Figure 5:
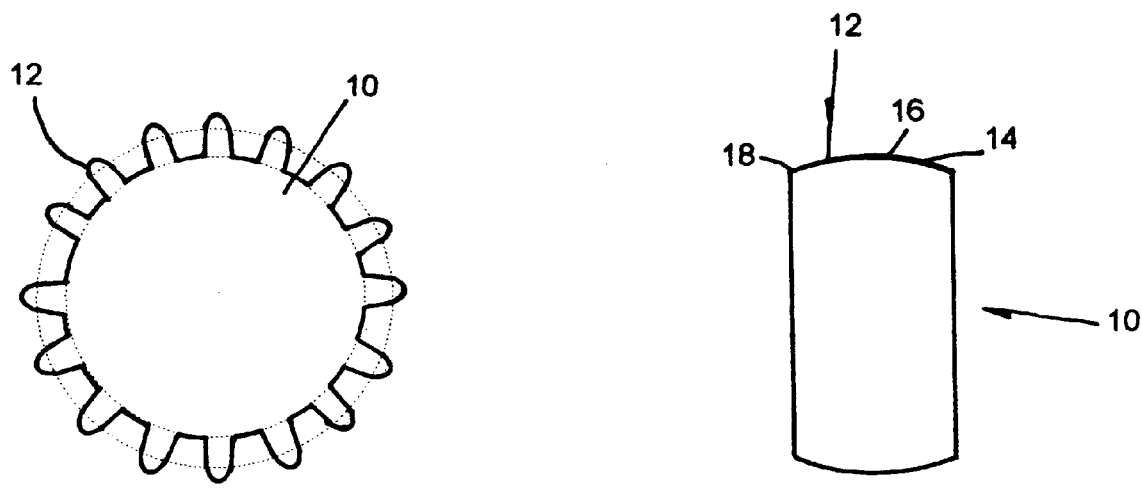
FIG. 5 illustrates a schematic elevational view of a pinion profile configured in accordance with the principles of the present invention.

As shown in FIG. 5, a pinion 10 is provided with a plurality of gear teeth 12. The gear teeth 12 include arcuate contact edges 14. The contact edges 14 are provided with radii of curvature that taper outwardly from the respective centers 16 of the gear teeth 14. It has been found that particularly advantageous to provide the pinion 10 with contact edges 14 having a radius of curvature of 45 mm for a gear wheel having a diameter of 10.5 mm. Of course, these dimensions represent an aspect ratio that will vary with the size of the gear.

Figure 6:
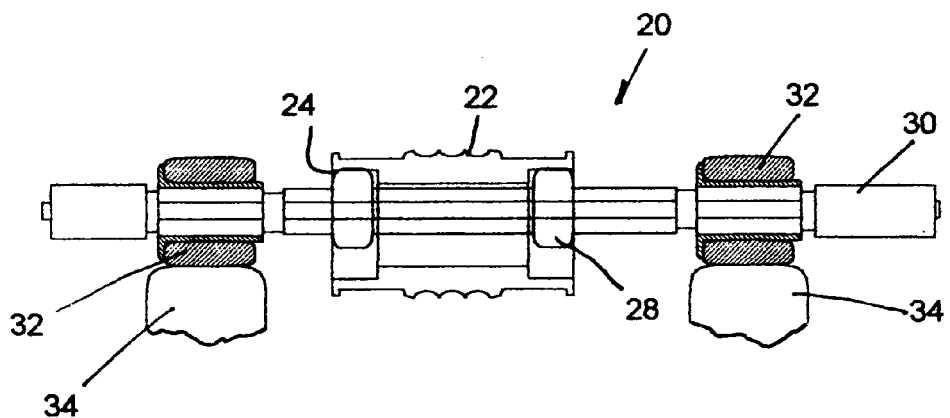
FIG. 6 illustrates a schematic sectional view of a double-pinion drive mechanism configured in accordance with the principles of the present invention.

FIG. 6 illustrates a double-pinion drive mechanism 20. The drive mechanism 20 includes an annular cylindrical gear wheel 22 having an internal gear tooth profile 24 on each end. A pair of toothed pinions 28 are mounted on a shaft 30. The teeth of the pinions 28 are arcuate, as shown in the pinion illustrated in FIG. 5, and are intended to mesh with the tooth profiles 24 to drive a set of friction tires 32. The pinions 28 have an external diameter slightly smaller than the internal diameter of the gear wheel 22.

As can be seen in FIG. 6, the rounded contact edges of the pinions 28 allow the shaft 30 to "roll" axially with respect to the axis of the gear wheel 22. Thus, the friction tires 32 can remain square with their corresponding support rollers 34.

Figure 7:
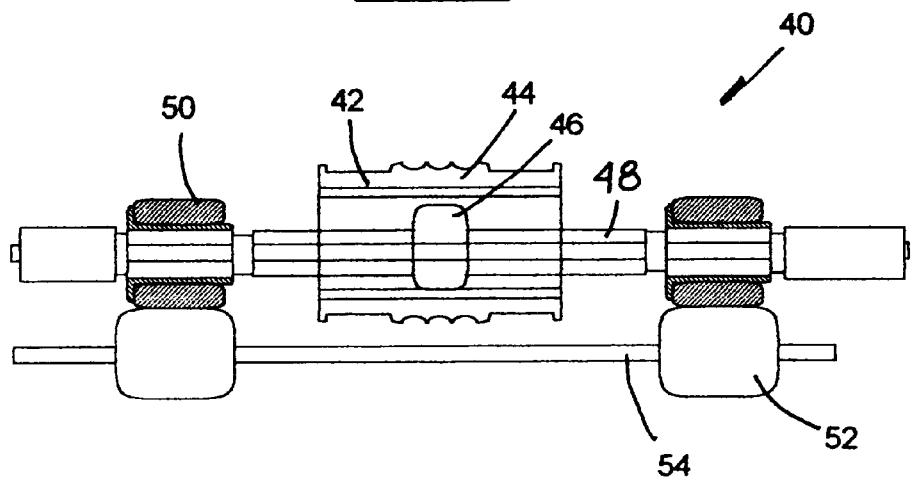
FIG. 7 illustrates a schematic sectional view of a single-pinion drive mechanism configured in accordance with the principles of the present invention.

Even greater flexibility is achieved with a single-pinion drive mechanism 40, as illustrated in FIG. 7. The drive mechanism 40 includes an annular cylindrical gear wheel 42 having an internal gear tooth profile 44 at its center. A single toothed pinion 46 is mounted on a shaft 48. The teeth of the pinion 46 are arcuate, as shown in the pinion illustrated in FIG. 5, and are intended to mesh with the tooth profile 44 to drive a set of friction tires 50. The pinion 46 has an external diameter slightly smaller than the internal diameter of the gear wheel 42.

As can be seen in FIG. 7, the rounded contact edges of the pinion 46 allow the shaft 48 to "roll" axially with respect to the axis of the gear wheel 42. Thus, the friction tires 50 can remain square with their corresponding support rollers 52 through a significant axial misalignment between the shaft 48 and a shaft 54 upon which the support rollers 52 are mounted.

Although the present invention has been described with reference to specific embodiments, those of skill in the art will recognize that changes may be made thereto without departing from the scope and spirit of the invention For example, it is contemplated that the present invention will find utility in any arrangement in which drive shafts are advantageously maintained parallel.

What is claimed is:

1. A sheet material feed mechanism comprising the following:
    a gear wheel shaft having a longitudinal axis;
    a pinion mounted for rotation with the gear wheel shaft, the pinion having a longitudinal axis coincident with the longitudinal axis of the shaft;
    a gear wheel surrounding the pinion, the gear wheel having a longitudinal axis capable of non-parallel alignment with the longitudinal axis of the gear wheel shaft; and
    a support roller assembly including at least one support roller, the support roller assembly having a longitudinal axis;
    whereby the pinion is adapted and constructed to impart uninterrupted rotational movement to the gear wheel when the longitudinal axis of the gear wheel is parallel to the longitudinal axis of the support roller assembly and out of parallel alignment with the longitudinal axis of the pinion.

2. A sheet material feed mechanism according to claim 1, further comprising the following:
    a plurality of gear wheel gear teeth on an interior surface of the gear wheel; and
    a plurality of pinion gear teeth on an exterior surface of the pinion, the pinion gear teeth having arcuate contact edges adapted to drivingly engage the gear wheel gear teeth.

3. A sheet material feed mechanism according to claim 2, wherein the contact edges of the pinion gear teeth have tapering radii of curvature.

4. A sheet material feed mechanism according to claim 3, wherein the contact edges of the pinion gear teeth taper outwardly from the respective centers of the gear teeth.

5. A sheet material feed mechanism according to claim 3, wherein the contact edges of the pinion gear teeth having a radius of curvature of 45 mm for a gear wheel having a diameter of 10.5 mm.

6. A sheet material feed mechanism according to claim 1, wherein there is a one-to-one correspondence of pinions to gear wheels in the sheet feed mechanism.

7. A sheet material feed mechanism according to claim 1, further comprising at least one friction wheel mounted on the gear wheel shaft.

8. A sheet material feed mechanism according to claim 7, wherein sheet material is fed between the support rollers and the friction wheels.

9. In a sheet material feed mechanism, a gear wheel assembly comprising the following:
    a gear wheel shaft having a longitudinal axis;
    an annular cylindrical gear wheel including an interior surface defining an interior diameter, with a plurality of gear teeth extending from the interior surface, the gear wheel having a longitudinal axis capable of non-parallel alignment with the longitudinal axis of the gear wheel shaft;
    a pinion mounted for rotation with the gear wheel shaft, the pinion including an exterior surface defining an outer diameter, the outer diameter of the pinion being less than the inner diameter of the gear wheel, with a plurality of gear teeth extending outwardly from the exterior surface of the pinion, the pinion gear teeth having arcuate contact edges adapted to drivingly engage with gear teeth of the gear wheel, the pinion having a longitudinal axis coincident with the longitudinal axis of the shaft; and
    a support roller assembly including at least one support roller, the support roller assembly having a longitudinal axis;
    whereby the pinion is adapted and constructed to impart uninterrupted rotational movement to the gear wheel when the longitudinal axis of the gear wheel is parallel to the longitudinal axis of the support roller assembly and out of parallel alignment with the longitudinal axis of the pinion.

10. A gear wheel assembly according to claim 9, wherein the contact edges of the pinion gear teeth have tapering radii curvature.

11. A gear wheel assembly according to claim 10, wherein the contact edges of the pinion gear teeth taper outwardly from the respective centers of the gear teeth.

12. A gear wheel assembly according to claim 11, wherein the contact edges of the pinion gear teeth having a radius of curvature of 45 mm for a gear wheel having a diameter of 10.5 mm.

13. A gear wheel assembly according to claim 9, wherein there is a one-to-one correspondence of pinions to gear wheels in the sheet feed mechanism.

14. A gear wheel assembly according to claim 9, further comprising at least one friction wheel mounted on the gear wheel shaft.

15. A method of maintaining parallelism between a gear wheel and a support roller assembly in a sheet material feed mechanism, the method comprising the following steps:

providing a gear wheel shaft having a longitudinal axis;

providing a pinion mounted for rotation with the gear wheel shaft, the pinion having a longitudinal axis coincident with the longitudinal axis of the shaft;

providing a gear wheel surrounding the pinion, the gear wheel having a longitudinal axis capable of non-parallel alignment with the longitudinal axis of the gear wheel shaft; and providing a support roller assembly including at least one support roller, the support roller assembly having a longitudinal axis;

actuating the pinion to impart uninterrupted rotational movement to the gear wheel when the longitudinal axis of the gear wheel is parallel to the longitudinal axis of the support roller assembly and out of parallel alignment with the longitudinal axis of the pinion.

16. A method according to claim 15, wherein the step of providing a gear wheel further comprises providing a plurality of gear wheel gear teeth on an interior surface of the gear wheel, and wherein the step of providing a pinion further comprises providing a plurality of pinion gear teeth on an exterior surface of the pinion, the pinion gear teeth having arcuate contact edges adapted to drivingly engage the gear wheel gear teeth.

17. A method according to claim 16, wherein the step of providing a plurality of pinion gear teeth further comprises providing the pinion teeth with contact edges with tapering radii of curvature.

18. A method according to claim 17, wherein the step of providing the pinion teeth with contact edges with tapering radii of curvature further comprises providing the pinion gear teeth with contact edges that taper outwardly from the respective centers of the gear teeth.

19. A method according to claim 18, wherein the step of providing the pinion teeth with contact edges with tapering radii of curvature further comprises providing the pinion gear teeth with contact edges having a radius of curvature of 45 mm for a gear wheel having a diameter of 10.5 mm.

* * * * *